United States Patent
Mishra et al.

(10) Patent No.: US 7,487,274 B2
(45) Date of Patent: Feb. 3, 2009

(54) METHOD AND APPARATUS FOR GENERATING UNIQUE IDENTIFICATION NUMBERS FOR PCI EXPRESS TRANSACTIONS WITH SUBSTANTIALLY INCREASED PERFORMANCE

(75) Inventors: Kishore Kumar Mishra, Santa Clara, CA (US); Purna Chandra Mohanty, Santa Clara, CA (US)

(73) Assignee: ASIC Architect, Inc., Santa Clara, CA (US)

( * ) Notice: Subject to any disclaimer, the term of this patent is extended or adjusted under 35 U.S.C. 154(b) by 165 days.

(21) Appl. No.: 11/461,445

(22) Filed: Jul. 31, 2006

(65) Prior Publication Data

US 2007/0028017 A1 Feb. 1, 2007

Related U.S. Application Data

(60) Provisional application No. 60/595,740, filed on Aug. 1, 2005.

(51) Int. Cl.
*G06F 5/00* (2006.01)
*G06F 13/00* (2006.01)
(52) U.S. Cl. .............. 710/62; 710/1; 710/34; 710/52; 710/62; 710/22; 710/260; 710/305
(58) Field of Classification Search .......... 710/1, 710/34, 52, 22, 260, 305, 62
See application file for complete search history.

(56) References Cited

U.S. PATENT DOCUMENTS

| 6,298,407 | B1 | 10/2001 | Davis et al. | |
|---|---|---|---|---|
| 6,944,617 | B2 | 12/2001 | Harriman | |
| 6,760,793 | B2 | 7/2002 | Kelley et al. | |
| 6,950,905 | B2 | 2/2003 | Wu et al. | |
| 7,028,130 | B2 | 8/2003 | Lueck et al. | |
| 6,990,549 | B2 * | 1/2006 | Main et al. | 710/306 |
| 7,043,588 | B2 * | 5/2006 | Konetski | 710/303 |
| 7,315,911 | B2 * | 1/2008 | Davies et al. | 710/260 |
| 2003/0043805 | A1 | 3/2003 | Graham et al. | |
| 2004/0208130 | A1 | 10/2004 | Mizutani et al. | |
| 2005/0060470 | A1 * | 3/2005 | Main et al. | 710/305 |
| 2005/0238038 | A1 | 10/2005 | Keller et al. | |

* cited by examiner

*Primary Examiner*—Tammara Peyton
(74) *Attorney, Agent, or Firm*—Intellectual Property Law Group LLP; Otto O. Lee; Juneko Jackson

(57) ABSTRACT

A method and apparatus for generating identification numbers for PCI Express that provides unique generation and substantially increased system performance. A system having a PCI Express fabric and PCI devices connected thereto generates unique TAG identification numbers for transactions with substantially increased performance. The system generates and prepares up to three available TAG IDs in advance, before a request is granted. When a completion-required request receives a grant, it picks up the TAG ID from the storage rather than generating it on the fly. This enables the system to process back-to-back TLP requests without any dead cycles.

15 Claims, 3 Drawing Sheets

METHOD AND APPARATUS FOR GENERATING UNIQUE IDENTIFICATION NUMBERS FOR PCI EXPRESS TRANSACTIONS WITH SUBSTANTIALLY INCREASED PERFORMANCE

CROSS-REFERENCE TO RELATED APPLICATIONS

This application claims the benefit of U.S. Provisional Application No. 60/595,740, filed on Aug. 1, 2005, which is hereby incorporated by reference.

FIELD OF THE INVENTION

The invention relates generally to the PCI Express model of data transfer, and in particular to a method and apparatus for generating identification numbers for PCI Express transactions that guarantees unique generation and substantially increased system performance.

BACKGROUND OF THE INVENTION

PCI Express ("PCIe") was developed to overcome the traditional limitations with the older Peripheral Component Interface ("PCI") model. In contrast to the parallel method of data transfer used in PCI, the PCIe bus transfers data serially. The PCIe model also has a point-to-point bus topology, pursuant to which a shared switch replaces the shared bus of the PCI model, and each PCIe device is provided with its own individual bus through which to communicate with the shared switch.

When two devices are communicating, the communicated data is broken up into discrete data packets, also known as transmission layer packets ("TLPs"). TLPs in a PCIe model are comprised of multiple bytes of information. The shared switch in the PCIe system routes bus traffic and also establishes point-to-point connections between any two communicating devices within a PCIe network. The TLPs are routed back and forth between the communicating devices by the shared switch along the respective links.

TLPs need to be properly tracked in the system. PCI Express therefore uses a global transaction ID concept to track transactions. The transaction ID must be unique for all request transactions that require completion. Each transaction ID consists of a bus number, device number, function number, and TAG ID. When a TLP for a request is returned by the "completer" (the portion of the system that completes transaction requests), the completer sends along the transaction ID within the completed TLP. The requester then looks at the transaction ID to see whether the completed TLP is meant for it.

While the combination of the bus number, device number and function number are enough to make any function of a bus or device unique, a single function can send multiple requests out that are still waiting for completion. The TAG ID is therefore used to distinguish these transactions further, so that even pending multiple requests from a single function can be uniquely identified. The PCI Express architecture requires a unique TAG ID for every completed TLP, but it does not specify how to generate them.

Several problems can occur as a result of improper generation of TAG ID values. In one scenario, the system could assign the same TAG ID to multiple requests. This would lead to improper tracking of transactions, which in turn could lead to loss or a mix-up of crucial data. In another scenario, many cycles could be unnecessarily spent on generating TAG IDs; this degrades transmission performance for processor-intensive transactions, particularly for "back-to-back" TLPs (i.e., when an incoming TLP begins being processed at the exact same cycle as the current TLP is finished being processed). Back-to-back TLPs, a relatively new capability of PCI Express systems thanks to recent technological improvements, are processed one after the other, with no dead cycles in between the processing. This creates a problem for many systems that generate TAG IDs on the fly, because they cannot generate TAG IDs quickly enough. The result is dead cycles as the system slows down to generate TAG IDs.

Therefore, a solution is needed that can guarantee unique TAG ID generation in a PCIe environment, and improve transaction performance so that TAG IDs can be generated in real time for back-to-back TLPs.

SUMMARY OF THE INVENTION

An objective of the present invention is to generate TAG IDs for Transaction Layer Packets (TLPs) in a PCI Express system in a way that provides for unique TAG ID generation and substantially improves system performance by supplying TAG IDs in real time for back-to-back TLPs.

In an embodiment, the present invention comprises a Central TAG ID Module which is configured to generate up to three unique TAG IDs in advance of a request grant and stores them in various registers. The invention further comprises the Central TAG ID Module containing a TAG ID storage space, a Next TAG Module, a TAG Retire Module, a 2-Deep Second Storage Module (the "FIFO Module"), a Prefetch Register and a Prefetch Logic. The TAG ID storage space stores all available unique TAG IDs, as well as corresponding FLAG bits which designate whether a TAG ID is available for use or not. The Next TAG Module looks at these FLAG bits and selects a TAG ID. The Next TAG Module then routes the TAG ID to the 2-Deep FIFO Module if the FIFO Module is not full. The Prefetch Logic is configured to receive signals from the PCI Express Core and other modules. When the last cycle of the current request is being processed, the Prefetch Logic reads the TAG ID from the FIFO Module and writes it to the Prefetch Register, if it is empty. From there, a requesting entity can pick up the TAG ID from the Prefetch Register. The TAG Retire Module clears the FLAG bit for that TAG ID from the storage space, and the process repeats. In this fashion, TAG IDs are generated and stored in the FIFO Module and Prefetch Register before the request is granted, and are sent along quickly and efficiently once the request is granted. This allows TAG IDs to be supplied in time for back-to-back TLPs to be processed consecutively with no dead cycles in between.

According to another embodiment, there is a method for generating unique TAG IDs for back-to-back TLPs in a PCIe architecture using the above-described Central TAG ID Module. The method comprises analyzing FLAG bits in a Storage Module to determine availability of TAG IDs; selecting an available TAG ID from the storage that corresponds to the FLAG Bit; reading the TAG ID into a Next Tag Module; writing a TAG ID to a non-full FIFO Module; reading in a TAG ID from the FIFO Module, writing the TAG ID to the Prefetch Register; receiving a signal from the PCI Express Core indicating that a new request is granted; reading in a TAG ID from the Prefetch Register to a Requesting Agent; receiving a signal indicating that the TLP is in its last cycle; receiving End_of tlp and Nullified_tlp signals; determining if a packet was nullified; if the packet is not nullified, reading a TAG ID from the FIFO Module and writing it to an empty Prefetch Register; if the packet is nullified, preventing the reading of a new_TAG ID from the FIFO Module into the Prefetch Register; receiving a signal indicating that a request has been granted; and repeating the process while requests continue to be asserted.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF THE INVENTION

The invention relates to a system and method for generating unique TAG IDs in a PCI Express design, in a way that substantially improves performance and enables TAG IDs to be generated for back-to-back TLPs. The invention eliminates the problem of dead cycles in between back-to-back TLPs, which are ordinarily caused by TAG IDs being generated during the processing of the TLP, by generating up to three TAG IDs in advance of the processing.

Figure 1:
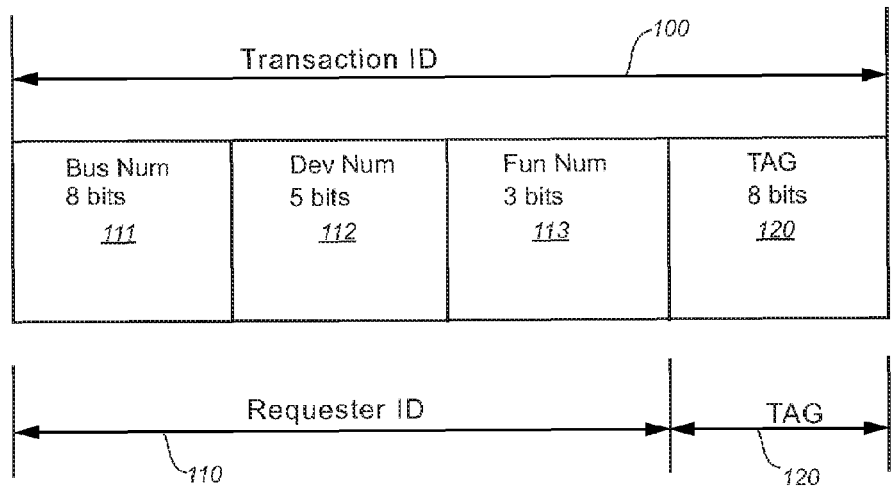
FIG. 1 illustrates a global transaction ID for use in a PCI Express system.

As shown in FIG. 1, a global transaction ID 100 consists of a Requester ID 110 and a TAG 120. The Requester ID 110 consists of three fields: a Bus Number 111, a Device Number 112, and a Function Number 113, all of which function together to make any function in any device and bus unique. These three numbers cannot adequately make transactions unique, however, when a function sends multiple requests that are simultaneously waiting for completion at a given time. This is because the three fields have a limited set of numbers generated, depending on the bus, device, and function from which the numbers are respectively derived. A TAG ID 120 in a PCI Express system is used to make such transactions unique. Some systems allow 8 bits for the TAG ID 120, meaning there can be a total of 256 unique TAG IDs. Other systems allow for 5 bits for the TAG ID 120, meaning there can be a total of 32 unique TAG IDs.

Figure 2:
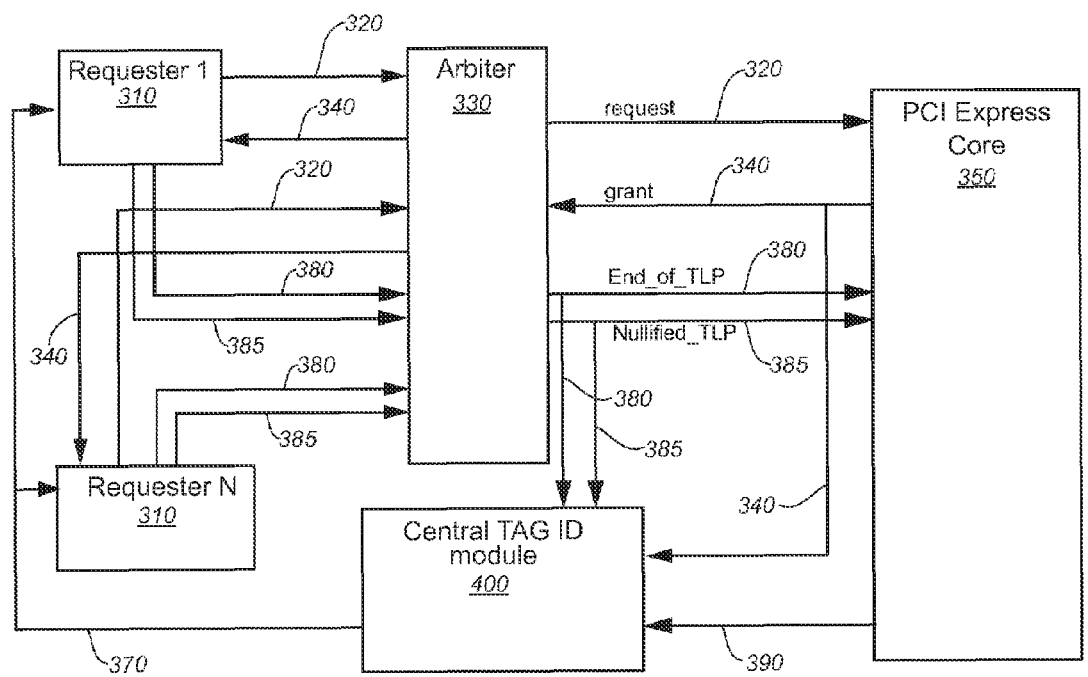
FIG. 2 illustrates a schematic overview of how modules interact with each other to produce and send a TAG ID within a PCI Express system according to an embodiment of the present invention.

FIG. 2 illustrates how the invention operates in the context of a PCI Express device, according to an embodiment of the present invention. One or more requesting agents 310, 1 through N, may be any function of a device or entity that needs to communicate with a PCI Express device. Requesting agents 310 send requests 320 to an Arbiter 330. Requests 320 are generally in the form of Request TLPs, although they may be in some other form that is readable by the PCI Express system. The Arbiter 330 is a device that accepts incoming requests 320 and other vital information from requesting agents 310, and passes the completed, granted requests 340 back to the requesting agents. The most important function of the Arbiter 330 is to pass on requests 320 to the PCI Express Core 350. The PCI Express Core 350 is the system that processes Request TLPs 320, and sends the granted requests 340 to the Arbiter 330 and to the Central Tag Module 400. The Central Tag Module 400 encompasses an embodiment of the present invention. Its purpose is to receive granted requests 340 from the PCI Express Core 350 and generate a unique TAG ID 370 for each grant. That unique TAG ID 370 is sent on to the requesting Agent 310 as long as there is no error in the TLP. Errors result in nullified TLPs that are no longer valid and returnable. A pair of signals indicating a nullified TLP 385 or the end of the TLP 380 packet is sent from a requesting agent 310 to the Arbiter 330, and from the Arbiter 330 to both the PCI Express Core 350 and the Central TAG ID Module 360.

According to an embodiment of the present invention, a request signal 320 is asserted from the application, and gets sent to the transaction layer of the PCI Express Core 350. The PCI Express Core 350 then qualifies the request 320 with various conditions such as credit availability and room inside the retry buffer. If the request 320 passes through all of the required logic gates, the qualified request 320 then reaches the arbiter 330 inside the PCI Express Core 350. The arbiter in the PCI Express Core 350 gives a grant to one of the requests, then sends the TLP to the PCI Express Device on the other end of the PCI Express link. When the device on the other end returns a completion TLP indicating that the TLP has completed, the PCI Express Core sends the completion TLP 390 to a Central TAG ID Module 400. The Central TAG ID Module 400 keeps track of assigned and available TAG IDs, and retires a TAG ID when the final completion for a request is received. The TAG ID 370 is routed to the granted TLP header.

Figure 3:
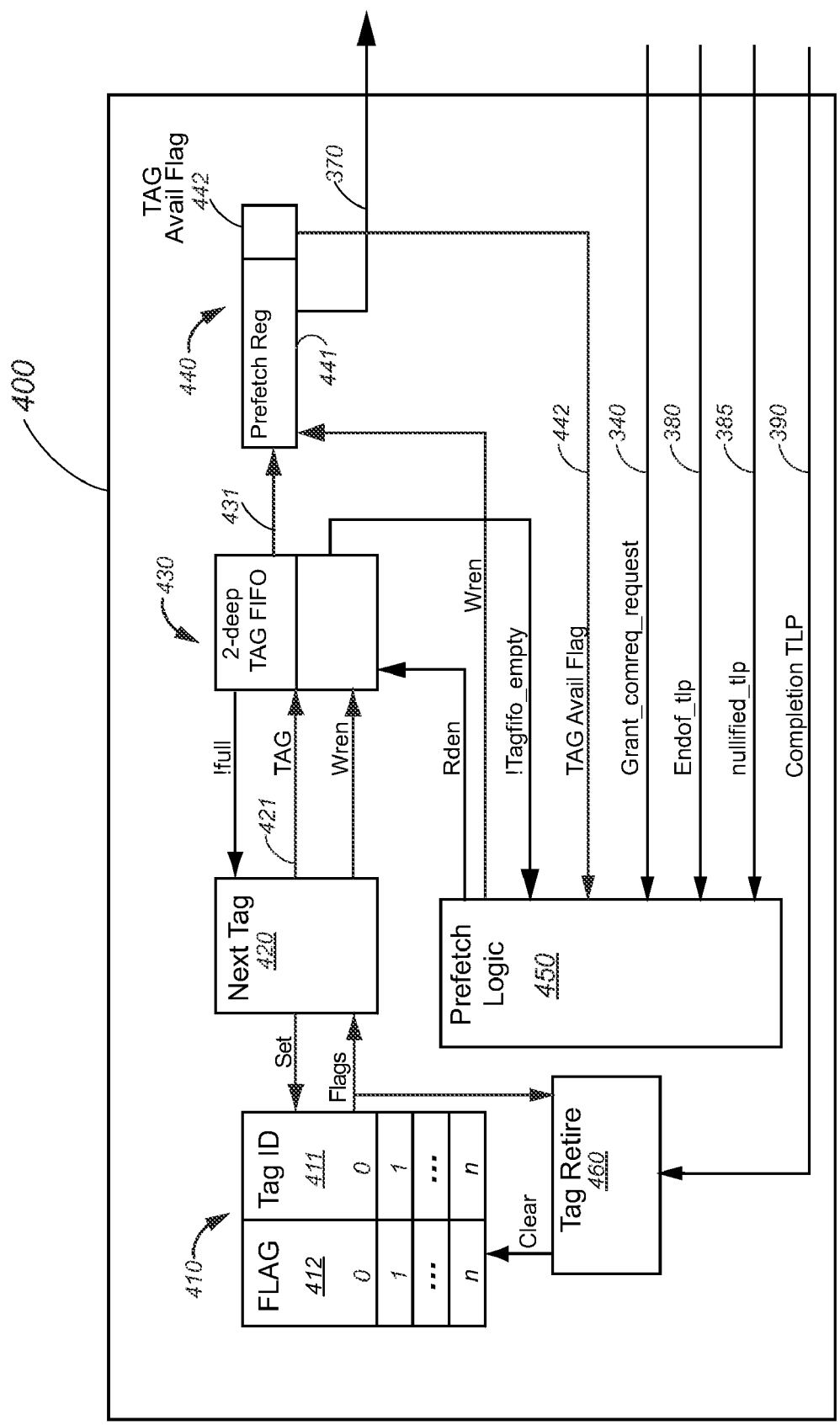
FIG. 3 illustrates a schematic overview of a Central TAG ID Module which generates a unique TAG ID and sends it to a requesting entity, according to an embodiment of the present invention.

FIG. 3 illustrates how the Central TAG ID Module 400 operates, according to an embodiment of the present invention. A Storage Module 410 stores TAG IDs 411 and their corresponding FLAG bits 412. In one embodiment, there are 256 TAG IDs 411 stored, with values ranging from 0 to 255. In another embodiment, only 32 unique TAG IDs may be stored. Each TAG ID 411 corresponds to a FLAG bit 412 that indicates whether that TAG ID is available for use or not. A FLAG bit is cleared, marking a TAG ID as "available," if the TAG ID is unique and can be used without other transactions in the system using the same TAG ID. In this way, the present invention allows unique TAG ID generation for TLPs to be realized.

In an embodiment, the Next TAG Module 420 analyzes the FLAG bits 412 and chooses a TAG ID 421 that is available for use. The Next TAG Module 420 determines whether it should send the TAG ID 421 into a Second Storage Module 430.

In another embodiment, the Second Storage Module 430 has two storage layers for storing a total of two TAG IDs. In a preferred embodiment, the Second Storage Module 430 utilizes a "First-In-First-Out" (FIFO) model of storage. The "First-In-First-Out" (FIFO) model of storage operates in such a way that the first incoming piece of data is also the first outgoing piece of data.

In another embodiment, the FIFO Module 430 is configured to communicate to the Next TAG Module 420 whether the FIFO Module 430 is full or not. If the FIFO Module 430 is not full, then the Next TAG Module 420 will write the selected TAG ID 421 into the FIFO Module 430. After writing to the FIFO Module 430, the Next TAG Module 420 sets the FLAG bit in the Storage Module 410 corresponding to that TAG ID 421.

The FIFO Module 430 consists of two layers of storage space such that two discrete TAG IDs may be simultaneously stored therein. The FIFO Module 430 receives incoming TAG IDs 421 from the Next TAG Module 420, and sends them on to a Prefetch Register 440 if certain conditions are met. A pair of signals is sent to the Central Tag Module 400, indicating either that the TLP has been nullified 385 due to an error, or that the TLP processing has ended 380 successfully. If the signals show that the TLP processing has ended, then the FIFO Module 430 will send a TAG ID to the Prefetch Register 440 if the Prefetch Register 440 indicates that is it available to store a TAG ID. Thus, the FIFO Module 430 allows for TAG IDs to get sent from the Next Tag Module 420 to the Prefetch Register 440. In a preferred embodiment, the TAG IDs are outputted in the order that they were inputted.

The Prefetch Register 440 is configured to store a TAG ID and a TAG Availability FLAG 442. The TAG Availability FLAG 442 conveys information on whether the Prefetch Register is empty or not. If the TAG Availability FLAG 442 is set, that means the Prefetch Register 440 is not empty. If the TAG Availability FLAG 442 is cleared, that indicates that the Prefetch Register 440 is empty and a TAG ID 431 can be written into it.

In an embodiment, both the FIFO Module 430 and the Prefetch Register 440 are simply storage spaces, and a Prefetch Logic 450 performs logical operations that make the system function. Other embodiments may feature one or more other devices that perform logical operations in order to send a Tag ID from a Storage Module 410, to a Next TAG Module 420, to a FIFO Module 430, or to a Prefetch Register 440. Further embodiments may include logic capabilities within the FIFO Module 430 structure and the Prefetch Register 440 structure. Hereinafter, unless otherwise noted, all of these possibilities will be referred to as "logic device" for simplicity. FIG. 3 illustrates a single Prefetch Logic module 450 as a preferred embodiment.

The preferred embodiment contains a logic device 450 that performs several logic functions. The logic device 450 receives information from the Prefetch Register 440 on whether the Prefetch Register 440 is available or not by looking at the TAG Availability FLAG 442 located in the Prefetch Register 440. If the Prefetch Register 440 is available, the logic device 450 reads in the TAG ID 431 from the FIFO Module 430 and writes it to the Prefetch Register 440. The logic device 450 then sets the TAG Availability FLAG 442 on the Prefetch Register 440, indicating that the TAG ID 431 in the Prefetch Register 440 is available to be picked up by a requesting agent 310.

The logic device 450 receives various signals from other modules in the PCI Express system. A Grant_comreq_request signal 340 may be received from the PCI Express Core 350, as illustrated in FIG. 2. This signal indicates that a Request TLP has been processed by the PCI Express Core 350, and a new completion-required request has been granted. When this occurs, a new TAG ID 370 must be routed to the requesting agent 310 that sent the request 320. Once the requesting agent receives the grant, it reads in the TAG ID 370 from the Prefetch Register 440. The logic device 450 receives information from the FIFO Module 430 on whether it is empty or not. If it is empty, the logic device 450 clears the TAG Availability FLAG 442 in the Prefetch Register 440.

In a preferred embodiment, a TAG Retire Module 460 is located within the Central TAG Module 400. Its purpose is to clear the FLAG bit 412 of a TAG ID 411 once the requesting agent 310 is finished using that TAG ID 411, thus indicating that the TAG ID 411 is once again available. Once a request is granted, a TAG ID 370 is sent on, and a signal comes in from the requesting agent 310 indicating that the TLP is completed, that particular TAG ID can be reused by the system again, since TAG IDs only need to be unique within the context of pending requests. Once the TAG Retire Module 460 clears the FLAG bit, the corresponding TAG ID is once again unique and can be reused. In this way, the present invention provides for unique TAG ID generation. When a completer device in the PCI Express system completes a TLP, a completion_tlp signal 390 is sent from the PCI Express Core 350 to the TAG Retire Module 460 in the Central TAG Module 400. The TAG Retire Module 460 clears the FLAG bit 412 for the specific TAG ID 370. In other embodiments, the TAG Retire Module 460 can be substituted with any logic device that can clear FLAG bits 412 in the Storage Module 410.

At this point in the TAG ID generation cycle, the previous completion-required request has been granted and the previous TAG ID 370 has been sent to a requesting agent. The Prefetch Register 440 is once again available, and a new request TLP may be processed by the PCI Express Core 350. The logic device 450 monitors this process, and when the process enters into the last cycle, a new TAG ID 431 is ready to be read from the FIFO Module 430, by the logic device 450, and written into the Prefetch Register 440. The TAG Availability FLAG 442 is set, indicating that the TAG ID 431 in the Prefetch Register 440 is available to be picked up by the requesting agent 310.

The logic device 450 receives signals during the last cycle of TLP processing. These signals come from the requesting agent 310 that requested the previous grant, and act as a follow-up to how that previous TLP was handled by the requesting agent 310. In one embodiment, these signals may get sent from requesting agents 310 to a device such as an Arbiter 330 and on to the PCI Express Core 350 and Central TAG ID Module 400. Other embodiments may send the signals from another source. One signal is an Endof_tlp signal 380. It indicates confirmation that a granted request was sent back to the requesting agent, and that the TLP ended successfully. This signal indicates that the FIFO Module 430 should send a new TAG ID 431 to the Prefetch Register 440 so that the requesting agent 310 can pick up that TAG ID. The Nullified_tlp signal 385 is driven during the same cycle as the Endof tlp signal 380, and indicates whether an error occurred that has caused the requesting agent to nullify the TLP. This means that the TAG ID 431 that was prepared for that packet should not get sent on from the FIFO Module 430 to the Prefetch Register 440. In this instance, the logic device 450 refrains from reading in the TAG ID 431 and sending it on to the Prefetch Register 440. The logic device 450 also keeps the TAG Availability FLAG 441 set, because the TAG ID stored in the Prefetch Register at that time will simply be used for the next granted request.

This cycle of moving a unique TAG ID from the Storage Module 410, to the Next TAG Module 420, to the FIFO Module 430, to the Prefetch Register 440 during the last cycle of the TLP processing, and finally to the requesting agent 310 when the request is granted, continues as long as requests continue to be granted and TAG IDs are needed.

Figure 4:
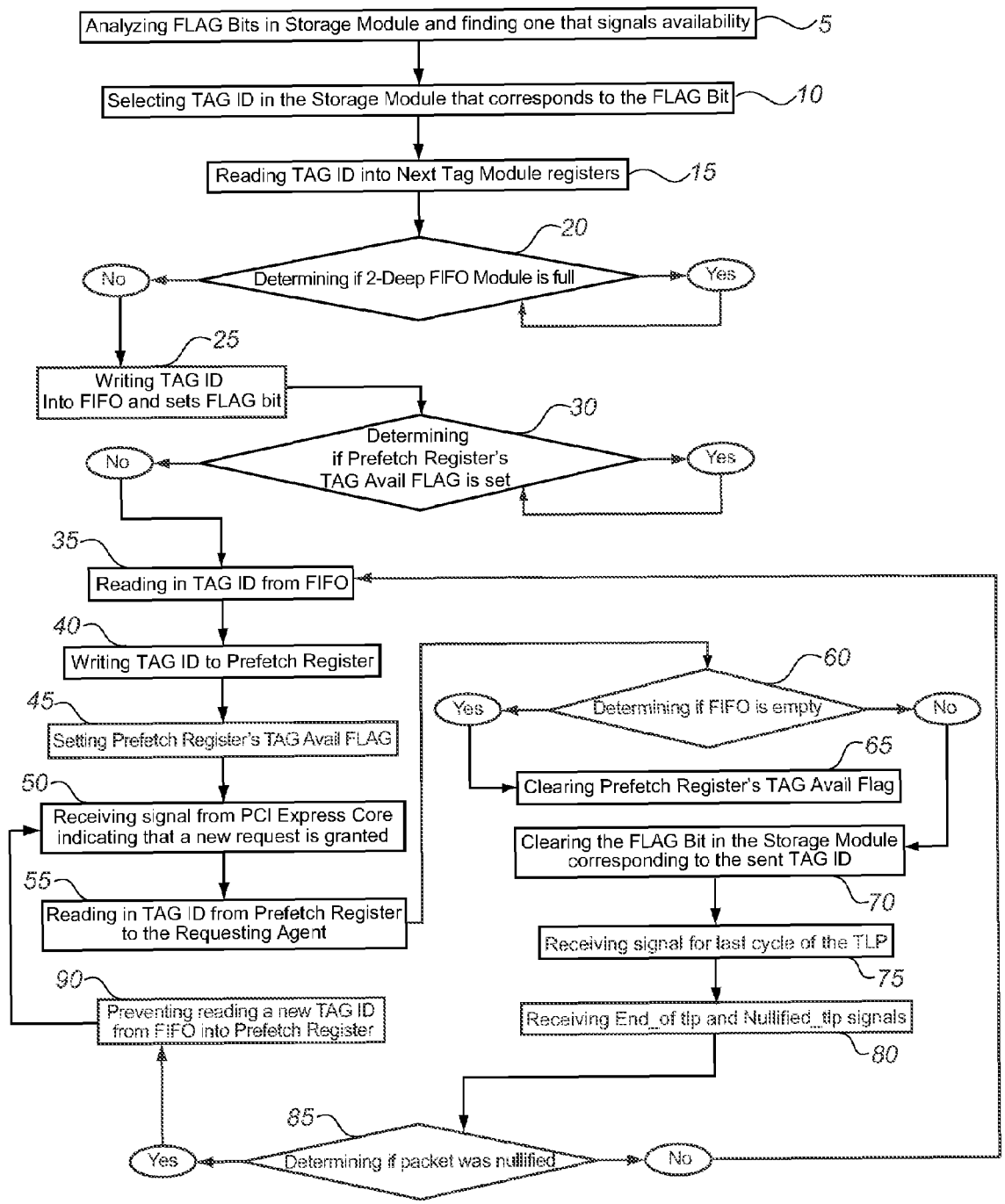
FIG. 4 illustrates a method according to an embodiment of the present invention.

As shown in FIG. 4, a method for generating unique TAG IDs for back-to-back TLPs in a PCIe architecture is described, according to an embodiment of the present invention. The method comprises analyzing FLAG bits in a Storage Module to see whether any TAG IDs are available 5, selecting an available TAG ID from the storage that corresponds to the FLAG Bit 10, reading the TAG ID into a Next Tag Module 15, and determining if a 2-deep FIFO Module is full. If the FIFO Module is not full, the method further comprises writing the TAG ID to a non-full FIFO Module 25, and determining if a TAG Available FLAG is set in a Prefetch Register 30. If the TAG Available FLAG is not set, the method further comprises reading in a TAG ID from the FIFO Module 35, writing the TAG ID to the Prefetch Register 40, setting the Prefetch Register's TAG Available FLAG 45, receiving a signal from the PCI Express Core indicating that a new request is granted 50, and reading in a TAG ID from the Prefetch Register to a Requesting Agent 55. The method further comprises determining if the FIFO is empty 60; if the FIFO is empty, the method further comprises clearing the Prefetch Register's TAG Available FLAG 65; if the FIFO is not empty, the method further comprises clearing the FLAG Bit in the Storage Module corresponding to the sent TAG ID 70. The method further comprises receiving a signal indicating that the TLP is in its last cycle of processing 75, receiving End_of tlp and Nullified_tlp signals 80, and determining if a packet was nullified 85. If the packet is not nullified, the method further comprises reading a TAG ID from the FIFO Module and writing it to an empty Prefetch Register 35; if the packet is nullified, the method further comprises preventing the reading of a new TAG ID from the FIFO Module into the Prefetch Register 90. Furthermore, the method comprises receiving a signal indicating that a request has been granted 50, and repeating the entire process while requests continue to be asserted.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

We claim:

1. A system for generating unique TAG IDs for back-to-back TLPs operating in a module within a PCI Express architecture, said system comprising:
    a Storage Module that stores available TAG IDs and corresponding FLAG bits;
    a NEXT TAG Module configured to analyze the FLAG bits in the Storage Module;
    a Prefetch Register that stores a unique TAG ID before it is sent to a selected requesting entity;
    a FIFO Module having two storage layers such that it may simultaneously store a first TAG ID and a second TAG ID; and
    a Prefetch Logic Module that is configured to determine whether the FIFO Module is storing a first TAG ID and configured to read the first TAG ID from the FIFO module if the FIFO module is not empty;
wherein the NEXT TAG Module is configured to select a next available TAG ID in the Storage Module and write said next available TAG ID to the FIFO Module.

2. The system according to claim 1, wherein the Prefetch Logic Module is further configured to determine if the Prefetch Register is currently storing a TAG ID.

3. The system according to claim 2, wherein the Prefetch Logic Module is further configured to write said first TAG ID to the Prefetch Register if said Prefetch Register is not currently storing a TAG ID.

4. The system according to claim 3, wherein the Prefetch Logic Module is further configured to write said first TAG ID to the Prefetch Register when a processed TLP has not been nullified.

5. The system according to claim 1, wherein the NEXT TAG Module sets a FLAG bit in the Storage Module, and wherein said FLAG bit corresponds to said next available TAG ID.

6. The system according to claim 1, wherein the NEXT TAG Module is further configured to determine if the FIFO Module is currently storing two TAG IDs.

7. A system for generating unique TAG IDs for back-to-back TLPs operating in a module within a PCI Express architecture, said system comprising:
    a Storage Module that stores available TAG IDs and corresponding FLAG bits;
    a NEXT TAG Module configured to analyze the FLAG bits in the Storage Module;
    a Prefetch Register that stores a unique TAG ID before it is sent to a selected requesting entity;
    a FIFO Module having two storage layers such that it may simultaneously store a first TAG ID and a second TAG ID; and
    a Tag Retire Module that is configured to clear a FLAG bit for an available TAG ID in the Storage Module;
wherein the NEXT TAG Module is configured to select a next available TAG ID in the Storage Module and write said next available TAG ID to the FIFO Module.

8. The system according to claim 7, wherein the Tag Retire Module is further configured to clear a FLAG bit that corresponds to a TAG ID of a completed TLP.

9. A system for generating unique TAG IDs, said system comprising:
    a First Storage Module that stores available TAG IDs and corresponding FLAG bits;
    a Second Storage Module having two storage layers such that it may simultaneously store a first TAG ID and a second TAG ID, and that is configured to read in an available TAG ID when the Second Storage Module is not storing two TAG IDs;
    a Prefetch Register that stores a unique TAG ID before it is sent to a selected requesting entity; and
    a Prefetch Logic Module that is configured to set a TAG ID of the Prefetch Register when said Prefetch Register is storing the unique TAG ID and the unique TAG ID is available for a requesting entity,
    wherein the Prefetch Logic Module is further configured to store the first TAG ID when a communication request of a requesting entity has been granted.

10. A system for generating unique TAG IDs, said system comprising:
    a First Storage Module that stores available TAG IDs and corresponding FLAG bits;
    a Second Storage Module having two storage layers such that it may simultaneously store a first TAG ID and a second TAG ID;
    a Prefetch Register that stores a unique TAG ID before it is sent to a selected requesting entity;
    a Prefetch Logic Module that is configured to set a TAG ID of the Prefetch Register when said Prefetch Register is storing the unique TAG ID and the unique TAG ID is available for a requesting entity; and
    a NEXT TAG Module that is configured to:
        analyze the FLAG bits in the First Storage Module;
        select a next available TAG ID in the First Storage Module; and
        write said next available TAG ID to the Second Storage Module if the Second Storage Module is not storing two TAG IDs.

11. A method for generating unique TAG IDs for back-to-back TLPs, said method comprising the steps of:

storing a first and second TAG ID in a storage unit, wherein the first and second TAG IDs have unique values;

routing the first TAG ID to a prefetch register if the prefetch register is empty;

generating a new TAG ID, wherein the new TAG ID has a unique value; and writing the new TAG ID to the storage unit when said storage unit is not already storing two TAG Ids;

wherein said routing step further comprises reading the first TAG ID from the storage unit during a last processing cycle of a TLP, and writing the first TAG ID to the prefetch register.

12. The method of claim 11, further comprising the step of clearing a FLAG bit in the prefetch register if the storage unit is empty.

13. The method of claim 11, further comprising the steps of reusing the first TAG ID when a TLP is nullified.

14. A method for generating unique TAG IDs for back-to-back TLPs, said method comprising the steps of:

storing a first and second TAG ID in a storage unit, wherein the first and second TAG IDs have unique values;

routing the first TAG ID to a prefetch register if the prefetch register is empty;

generating a new TAG ID, wherein the new TAG ID has a unique value; and writing the new TAG ID to the storage unit when said storage unit is not already storing two TAG Ids;

wherein said generating step further comprises:

storing a plurality of TAG IDs in a storage space;

storing a plurality of FLAG bits in the storage space, wherein each of said plurality of TAG IDs corresponds to a FLAG bit;

identifying an available TAG ID by analyzing the FLAG bits in the storage space;

setting a FLAG bit of the available TAG ID; and writing the available TAG ID to a NEXT TAG Module.

15. The method of claim 14, further comprising the steps of:

receiving a completion TLP;

identifying a retired TAG ID in the storage space that corresponds to a TAG ID of the completion TLP; and clearing a FLAG bit of the retired TAG ID.

* * * * *